(12) United States Patent
Ogawa et al.

(10) Patent No.: US 9,985,262 B2
(45) Date of Patent: May 29, 2018

(54) BATTERY

(71) Applicant: Sony Corporation, Tokyo (JP)

(72) Inventors: Kenichi Ogawa, Fukushima (JP);
Hiroyuki Akashi, Kanagawa (JP);
Kumiko Takagi, Fukushima (JP);
Tomitaro Hara, Fukushima (JP);
Yoshiaki Obana, Fukushima (JP);
Yosuke Hosoya, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days. days.

(21) Appl. No.: 14/796,399

(22) Filed: Jul. 10, 2015

(65) Prior Publication Data
US 2015/0318533 A1    Nov. 5, 2015

Related U.S. Application Data

(63) Continuation of application No. 11/278,571, filed on Apr. 4, 2006.

(30) Foreign Application Priority Data

Apr. 4, 2005 (JP) .................. 2005-107782

(51) Int. Cl.
*H01M 2/14* (2006.01)
*H01M 2/16* (2006.01)
(Continued)

(52) U.S. Cl.
CPC ........... *H01M 2/1686* (2013.01); *H01M 2/12* (2013.01); *H01M 2/1653* (2013.01); *H01M 4/48* (2013.01);
(Continued)

(58) Field of Classification Search
CPC ....................................................... H01M 2/26
See application file for complete search history.

(56) References Cited

U.S. PATENT DOCUMENTS 6,468,698 B1   10/2002  Hamano et al.
6,605,386 B1    8/2003  Kasamatsu et al.
(Continued)

FOREIGN PATENT DOCUMENTS

CN    1390365    1/2003
EP    1169744    6/2004
(Continued)

OTHER PUBLICATIONS

Li, et al., "Synthesis and Characterization of Silicon Nanowires on Mesophase Carbon Microbead Substrates by Chemical Vapor Deposition", J. Phys. Chem B., 109 (8), pp. 3291-3297, Jan. 25, 2005.
(Continued)

*Primary Examiner* — Jacob Marks
(74) *Attorney, Agent, or Firm* — Dentons US LLP

(57) ABSTRACT

A battery capable of improving the energy density and improving the battery characteristics such as cycle characteristics and high temperature storage characteristics. A cathode and an anode are oppositely arranged with a separator in between. The open circuit voltage in full charge is in the range from 4.25 V to 6.00 V. The separator has a base material layer and a surface layer. The surface layer opposed to the cathode is formed from at least one from the group consisting of polyvinylidene fluoride, polytetrafluoroethylene, polypropylene, and aramid.

19 Claims, 6 Drawing Sheets

(51) Int. Cl.

| | | |
|---|---|---|
| *H01M 2/12* | (2006.01) | |
| *H01M 4/58* | (2010.01) | |
| *H01M 4/48* | (2010.01) | |
| *H01M 4/505* | (2010.01) | |
| *H01M 4/525* | (2010.01) | |
| *H01M 4/587* | (2010.01) | |
| *H01M 10/0525* | (2010.01) | |
| *H01M 4/02* | (2006.01) | |
| *H01M 4/485* | (2010.01) | |
| *H01M 10/0565* | (2010.01) | |
| *H01M 10/0569* | (2010.01) | |
| *H01M 10/0587* | (2010.01) | |

(52) U.S. Cl.
CPC .......... *H01M 4/505* (2013.01); *H01M 4/525* (2013.01); *H01M 4/587* (2013.01); *H01M 4/5815* (2013.01); *H01M 10/0525* (2013.01); *H01M 4/485* (2013.01); *H01M 10/0565* (2013.01); *H01M 10/0569* (2013.01); *H01M 10/0587* (2013.01); *H01M 2004/027* (2013.01); *H01M 2200/106* (2013.01); *H01M 2200/20* (2013.01); *H01M 2300/0085* (2013.01)

(56) References Cited

U.S. PATENT DOCUMENTS

| | | | |
|---|---|---|---|
| 2002/0110731 A1 | 8/2002 | Coustier et al. | |
| 2002/0142214 A1* | 10/2002 | Pekala ................ | H01M 2/1673 429/144 |
| 2003/0180620 A1 | 9/2003 | Nakane et al. | |
| 2003/0219650 A1* | 11/2003 | Saruwatari .......... | H01M 2/0267 429/218.1 |
| 2004/0115523 A1 | 6/2004 | Hommura et al. | |
| 2004/0121234 A1 | 6/2004 | Le | |
| 2004/0142245 A1* | 7/2004 | Ishikawa ............... | H01M 2/145 429/247 |
| 2004/0146786 A1* | 7/2004 | Sato ....................... | H01G 9/038 429/326 |
| 2004/0234853 A1 | 11/2004 | Adachi et al. | |
| 2005/0118500 A1 | 6/2005 | Yata et al. | |

FOREIGN PATENT DOCUMENTS

| | | |
|---|---|---|
| JP | HEI 05-258741 | 10/1993 |
| JP | HEI 09-050800 | 2/1997 |
| JP | 2000-082451 | 3/2000 |
| JP | 2001-068168 | 3/2001 |
| JP | 2001-319634 | 11/2001 |
| JP | 2002-025531 | 1/2002 |
| JP | 2002-141042 | 5/2002 |
| JP | 2003-040999 | 2/2003 |
| JP | 2003-086162 | 3/2003 |
| JP | 2003-197172 | 7/2003 |
| JP | 2004-087209 | 3/2004 |
| JP | 2004-111160 | 4/2004 |
| JP | 2004-146190 | 5/2004 |
| JP | 2004-253393 | 9/2004 |
| JP | 2005-505117 | 2/2005 |
| JP | 2005/048380 | 5/2005 |
| JP | 2005-190874 | 7/2005 |
| JP | 2006-286531 | 10/2006 |
| JP | 2012-074403 | 4/2012 |
| JP | 2014-160684 | 9/2014 |
| WO | WO/02/065561 | 8/2002 |
| WO | WO/2005/022674 | 3/2005 |

OTHER PUBLICATIONS

Japanese Office Examination Report issued in connection with related Japanese Patent Application No. JP 2014-119478 dated Feb. 17, 2015.

Japanese Office Examination Report issued in connection with related Japanese Patent Application No. JP 2012-009453 dated Aug. 22, 2013.

Japanese Office Examination Report issued in connection with related Japanese Patent Application No. JP 2005-107782 dated Dec. 1, 2010.

Chinese Office Action corresponding to Chinese Serial No. 201410160133.5 dated Sep. 6, 2015.

Japanese Patent Office Action dated Feb. 23, 2016 corresponding to JP Serial No. 2015-085838.

* cited by examiner

BATTERY

CROSS REFERENCES TO RELATED APPLICATIONS

This application is a continuation of U.S. patent application Ser. No. 11/278,571 filed Apr. 4, 2006, the entirety of which is incorporated herein by reference to the extent permitted by law. The present invention also contains subject matter related to Japanese Patent Application JP 2005-107782 filed in the Japanese Patent Office on Apr. 4, 2005, the entire contents of which being incorporated herein by reference.

BACKGROUND OF THE INVENTION

1. Field of the Invention

The present invention relates to a battery using a separator made of polyolefin and the like.

2. Description of the Related Art

In recent years, portable electronic device technology has been significantly developed. Accordingly, electronic devices such as mobile phones and notebook computers have started to be recognized as a basic technology supporting the highly sophisticated information society. Further, research and development for sophisticating these electronic devices has been actively promoted. In proportion to such sophistication, the power consumption of these electronic devices continues to be increased. On the other hand, these electronic devices are demanded to be driven for a long time. Therefore, a high energy density of the secondary battery as a driving power source has been consequently demanded.

In view of the occupied volume and the weight of the battery built in the electronic devices, a higher battery energy density is more desirable. In these days, since lithium ion secondary batteries have a superior energy density, the lithium ion secondary battery is built in most devices.

In general, in the lithium ion secondary battery, lithium cobaltate is used for the cathode, a carbon material is used for the anode, and the operating voltage is used in the range from 4.2 V to 2.5 V. In an electric cell, ability to increase the terminal voltage up to 4.2 V highly depends on superior chemical stability of the nonaqueous electrolyte material, the separator and the like.

In traditional lithium ion secondary batteries operating at 4.2 V at maximum, for the cathode active material such as lithium cobaltate used for the cathode, only about 60% of the capacity to the theoretical capacity is used. Therefore, in principle, it is possible to utilize the remaining capacity by further increasing the charging voltage. In fact, it is known that a high energy density is realized by setting the voltage in charging to 4.25 V or more (for example, refer to International Publication No. WO03/019713).

SUMMARY OF THE INVENTION

However, in the battery setting the charging voltage over 4.2 V, oxidation atmosphere particularly in the vicinity of the cathode surface is intensified. In the result, the separator physically contacting the cathode is oxidized and decomposed. Thereby, there is a disadvantage that micro short circuit easily occurs particularly under the high temperature environment, and battery characteristics such as cycle characteristics and high temperature storage characteristics are lowered.

In view of the foregoing disadvantage, in the present invention, it is desirable to provide a battery setting the charging voltage over 4.2 V, which is capable of improving battery characteristics such as cycle characteristics and high temperature storage characteristics.

According to an embodiment of the present invention, there is provided a battery in which a cathode and an anode are oppositely arranged with a separator in between, wherein an open circuit voltage in a full charge state per a pair of the cathode and the anode is in the range from 4.25 V to 6.00 V, and at least part of the cathode side of the separator is made of at least one from the group consisting of polyvinylidene fluoride, polytetrafluoroethylene, polypropylene, and aramid.

According to the battery of the embodiment of the present invention, since the open circuit voltage in full charge is in the range from 4.25 V to 6.00 V, a high energy density can be obtained. Further, since at least part of the cathode side of the separator is made of at least one from the group consisting of polyvinylidene fluoride, polytetrafluoroethylene, polypropylene, and aramid, chemical stability of the separator can be improved, and occurrence of micro short circuit can be inhibited. Therefore, the energy density can be improved, and the battery characteristics such as cycle characteristics and high temperature storage characteristics can be improved.

Other and further objects, features and advantages of the invention will appear more fully from the following description.

DETAILED DESCRIPTION OF THE PREFERRED EMBODIMENTS

Embodiments of the present invention will be hereinafter described in detail with reference to the drawings.

First Embodiment

Figure 1:
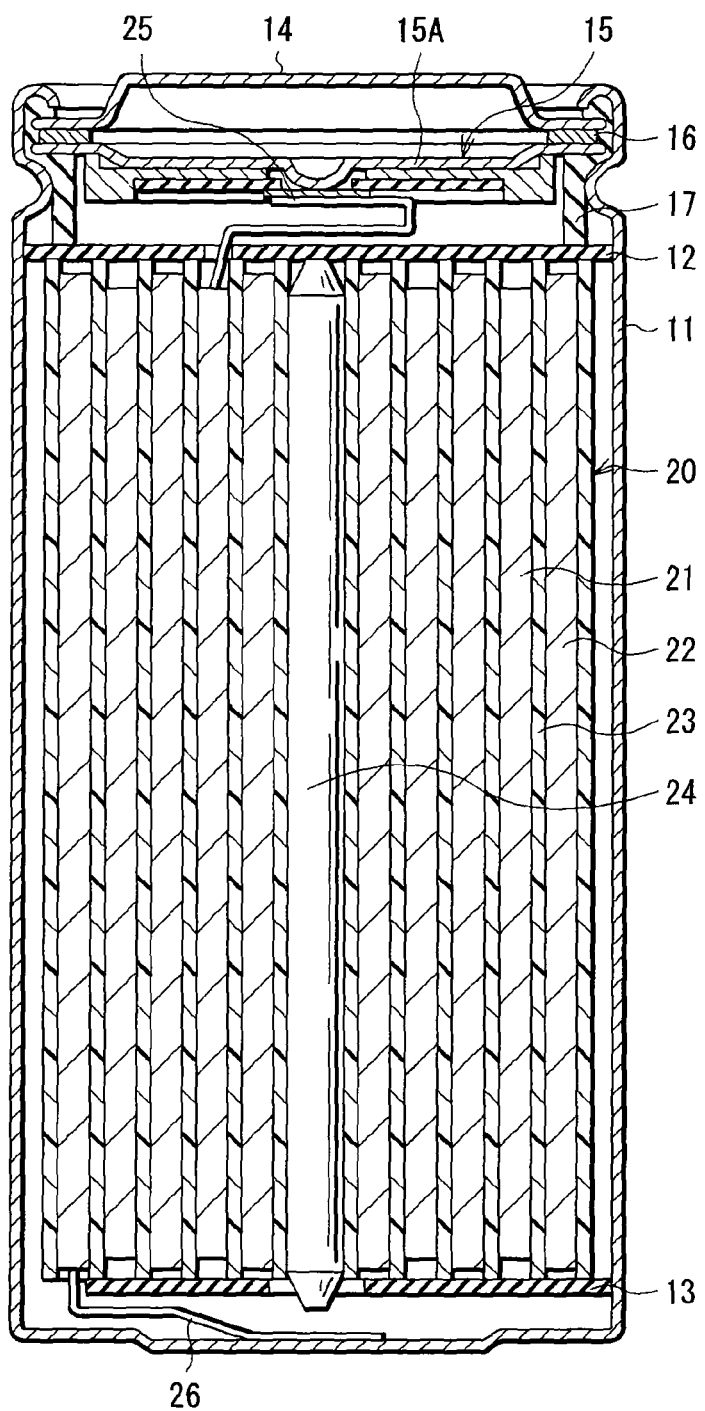
FIG. 1 is a cross section showing a structure of a secondary battery according to an embodiment of the present invention.

FIG. 1 shows a cross sectional structure of a secondary battery according to a first embodiment. The secondary battery is a so-called lithium ion secondary battery, in which lithium (Li) is used as an electrode reactant, and the anode capacity is expressed by the capacity component due to insertion and extraction of lithium. The secondary battery is a so-called cylinder type battery, and has a spirally wound electrode body 20, in which a pair of a strip-shaped cathode 21 and a strip-shaped anode 22 is wound with a separator 23 in between, inside a battery can 11 in the shape of approximately hollow cylinder. The battery can 11 is made of, for example, iron (Fe) plated by nickel (Ni) and one end thereof is closed, and the other end thereof is opened. Inside the battery can 11, a pair of insulating plates 12 and 13 is respectively arranged perpendicular to the spirally wound periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation by a large current. The gasket 17 is made of, for example, an insulating material and its surface is coated with asphalt.

The spirally wound electrode body 20 is wound centering on a center pin 24. A cathode lead 25 made of aluminum (Al) or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
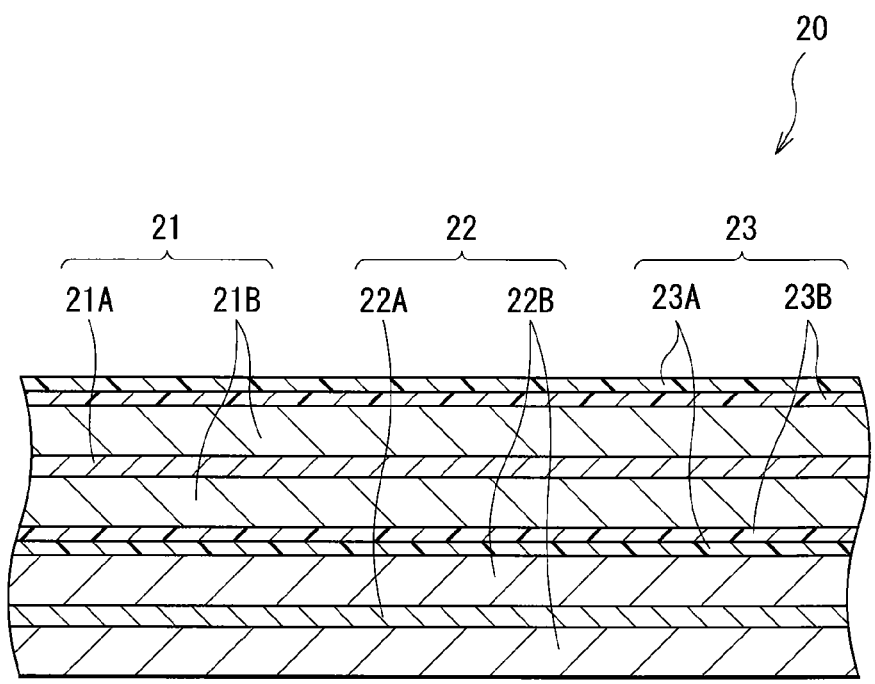
FIG. 2 is a cross section showing an enlarged part of a spirally wound electrode body in the secondary battery shown in FIG. 1.

FIG. 2 shows an enlarged part of the spirally wound electrode body 20 shown in FIG. 1. The cathode 21 has a structure in which, for example, a cathode active material layer 21B is provided on the both faces of a cathode current collector 21A having a pair of opposed faces. Though not shown, the cathode active material layer 21B may be provided on only one face of the cathode current collector 21A. The cathode current collector 21A is made of a metal foil such as an aluminum foil. The cathode active material layer 21B contains, for example, as a cathode active material, one or more cathode materials capable of inserting and extracting lithium. If necessary, the cathode active material layer 21B contains an electrical conductor such as graphite and a binder such as polyvinylidene fluoride.

As a cathode material capable of inserting and extracting lithium, for example, a lithium-containing compound such as a lithium oxide, a lithium phosphorous oxide, a lithium sulfide, and an intercalation compound containing lithium is appropriate. Two or more thereof may be used by mixing. In order to improve the energy density, a lithium-containing compound which contains lithium, transition metal elements, and oxygen (O) is preferable. Specially, a lithium-containing compound which contains at least one from the group consisting of cobalt (Co), nickel, manganese (Mn), and iron as a transition metal element is more preferable. Examples of lithium-containing compound include a lithium complex oxide having a bedded salt structure shown in Chemical formula 1, Chemical formula 2, or Chemical formula 3; a lithium complex oxide having a spinel structure shown in Chemical formula 4; a lithium complex phosphate having an olivine structure shown in Chemical formula 5 or the like. Specifically, $LiNi_{0.50}CO_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1) or the like can be cited.

$$Li_jMn_{(1-g-h)}Ni_gM1_hO_{(2-j)}F_k \quad \text{(Chemical formula 1)}$$

In the formula, M1 represents at least one from the group consisting of cobalt, magnesium (Mg), aluminum, boron (B), titanium (Ti), vanadium (V), chromium (Cr), iron, copper (Cu), zinc (Zn), zirconium (Zr), molybdenum (Mo), tin (Sn), calcium (Ca), strontium (Sr), and tungsten (W). f, g, h, j, and k are values in the range of 0.8≤f≤1.2, 0<g<0.5, 0≤h≤0.5, g+h<1, −0.1≤j≤0.2, and 0≤k≤0.1. The composition of lithium varies according to charge and discharge states. A value of f represents the value in a full discharge state.

$$Li_mNi_{(1-n)}M2_nO_{(2-p)}F_q \quad \text{Chemical formula 2}$$

In the formula, M2 represents at least one from the group consisting of cobalt, manganese, magnesium, aluminum, boron, titanium, vanadium, chromium, iron, copper, zinc, molybdenum, tin, calcium, strontium, and tungsten. m, n, p, and q are values in the range of 0.8≤m≤1.2, 0.005≤n≤0.5, −0.1≤p≤0.2, and 0≤q≤0.1. The composition of lithium varies according to charge and discharge states. A value of m represents the value in a full discharge state.

$$Li_rCo_{(1-s)}M3_sO_{(2-t)}F_u \quad \text{Chemical formula 3}$$

In the formula, M3 represents at least one from the group consisting of nickel, manganese, magnesium, aluminum, boron, titanium, vanadium, chromium, iron, copper, zinc, molybdenum, tin, calcium, strontium, and tungsten. r, s, t, and u are values in the range of 0.8≤r≤1.2, 0≤s<0.5, −0.1≤t≤0.2, and 0≤u≤0.1. The composition of lithium varies according to charge and discharge states. A value of r represents the value in a full discharge state.

$$Li_vMn_{2-w}M4_wO_xF_y \quad \text{(Chemical formula 4)}$$

In the formula, M4 represents at least one from the group consisting of cobalt, nickel, magnesium, aluminum, boron, titanium, vanadium, chromium, iron, copper, zinc, molybdenum, tin, calcium, strontium, and tungsten. v, w, x, and y are values in the range of 0.9≤v≤1.1, 0≤w≤0.6, 3.7≤x≤4.1, and 0≤y≤0.1. The composition of lithium varies according to charge and discharge states. A value of v represents the value in a full discharge state.

$$Li_zM5PO_4 \quad \text{Chemical formula 5}$$

In the formula, M5 represents at least one from the group consisting of cobalt, manganese, iron, nickel, magnesium, aluminum, boron, titanium, vanadium, niobium, copper, zinc, molybdenum, calcium, strontium, tungsten, and zirconium. z is a value in the range of 0.9≤z≤1.1. The composition of lithium varies according to charge and discharge states. A value of z represents the value in a full discharge state.

As a cathode material capable of inserting and extracting lithium, in addition to the foregoing, an inorganic compound not containing lithium such as $MnO_2$, $V_2O_5$, $V_6O_{13}$, NiS, and MoS can be cited.

The anode 22 has a structure in which an anode active material layer 22B is provided on the both faces of an anode current collector 22A having a pair of opposed faces. Though not shown, the anode active material layer 22B may be provided only on one face of the anode current collector 22A. The anode current collector 22A is made of, for example, a metal foil such as a copper foil The anode active material layer 22B contains, as an anode active material, one or more anode materials capable of inserting and extracting lithium. If necessary, the anode active material layer 22B contains a binder similar to of the cathode active material layer 21B.

In the secondary battery, the electrochemical equivalent of the anode material capable of inserting and extracting lithium is larger than the electrochemical equivalent of the cathode 21. In the middle of charge, lithium metal is not precipitated on the anode 22.

Further, in the secondary battery, the open circuit voltage when fully charged (that is, battery voltage) is designed to fall within the range from 4.25 V to 6.00 V. Therefore, the lithium extraction amount per unit weight is larger than in the battery in which the open circuit voltage when fully charged is 4.20 V even though the same cathode active material is used. Accordingly, the amounts of the cathode active material and the anode active material are adjusted. Thereby, a higher energy density can be obtained.

As an anode material capable of inserting and extracting lithium, for example, a carbon material such as non-graphitizable carbon, graphitizable carbon, graphite, pyrolytic carbons, cokes, glassy carbons, an organic high molecular weight compound fired body, carbon fiber, and activated carbon can be cited. Of the foregoing, cokes include pitch cokes, needle cokes, petroleum cokes and the like. The organic high molecular weight compound fired body is obtained by firing and carbonizing a high molecular weight material such as a phenol resin and a furan resin at an appropriate temperature, and some of them are categorized as non-graphitizable carbon or graphitizable carbon. As a high molecular weight material, polyacetylene, polypyrrole or the like can be cited. These carbon materials are preferable, since a change in the crystal structure occurred in charge and discharge is very small, a high charge and discharge capacity can be obtained, and favorable cycle characteristics can be obtained. In particular, graphite is preferable, since the electrochemical equivalent is large, and a high energy density can be obtained. Further, non-graphitizable carbon is preferable since superior characteristics can be obtained. Furthermore, a material with a low charge and discharge potential, specifically a material with the charge and discharge potential close to of lithium metal is preferable, since a high energy density of the battery can be easily realized.

As an anode material capable of inserting and extracting lithium, a material which is capable of inserting and extracting lithium, and contains at least one of metal elements and metalloid elements as an element can be also cited. When such a material is used, a high energy density can be obtained. In particular, such a material is more preferably used together with a carbon material, since a high energy density can be obtained, and superior cycle characteristics can be obtained. Such an anode material may be a simple substance, an alloy, or a compound of a metal element or a metalloid element, or may have one or more phases thereof at least in part. In the present invention, alloys include an alloy containing one or more metal elements and one or more metalloid elements, in addition to an alloy including two or more metal elements. Further, an alloy may contain nonmetallic elements. The texture thereof includes a solid solution, a eutectic crystal (eutectic mixture), an intermetallic compound, and a texture in which two or more thereof coexist.

As a metal element or a metalloid element composing the anode material, for example, magnesium, boron, aluminum, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), or platinum (Pt) can be cited. They may be crystalline or amorphous.

Specially, as the anode material, a material containing a metal element or a metalloid element of Group 4B in the short period periodic table as an element is preferable. A material containing at least one of silicon and tin as an element is particularly preferable. Silicon and tin have a high ability to insert and extract lithium, and can obtain a high energy density.

As an alloy of tin, for example, an alloy containing at least one from the group consisting of silicon, nickel, copper, iron, cobalt, manganese, zinc, indium, silver, titanium (Ti), germanium, bismuth, antimony (Sb), and chromium as a second element other than tin can be cited. As an alloy of silicon, for example, an alloy containing at least one from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

As an anode material capable of inserting and extracting lithium, other metal compound or a high molecular weight material can be further cited. As other metal compound, an oxide such as $MnO_2$, $V_2O_5$, and $V_6O_{13}$; a sulfide such as NiS and MoS; or a lithium nitride such as $LiN_3$ can be cited. As a high molecular weight material, polyacetylene, polyaniline, polypyrrole or the like can be cited.

The separator 23 has a base material layer 23A and a surface layer 23B provided on the face of the base material layer 23A, which is opposed to the cathode 21, or the both faces of the base material layer 23A. The surface layer 23B may be provided on the entire surface or on part of the surface of the base material layer 23A. In FIG. 2, the surface layer 23B is provided only on the face of the base material layer 23A, which is opposed to the cathode 21.

The base material layer 23A is made of, for example, a porous film made of a synthetic resin such as polypropylene and polyethylene. The base material layer 23A may have a structure in which two or more porous films as the foregoing porous films are layered. Specially, the polyolefin porous film is preferable since the polyolefin porous film has a superior short circuit prevention effect and is capable of improving safety of the battery by shut down effect. In particular, as a material of the base material layer 23A, polyethylene is preferable, since polyethylene obtains shutdown effects in the range from 100 deg C. to 160 deg C. and has superior chemical stability. Further, polypropylene is also preferable. In addition, as long as a resin has chemical stability, such a resin may be used by being copolymerized with polyethylene or polypropylene, or by being blended with polyethylene or polypropylene.

The surface layer 23B contains at least one from the group consisting of polyvinylidene fluoride, polytetrafluoroethylene, polypropylene, and aramid. Thereby, chemical stability is improved, and occurrence of micro short circuit is inhibited. When the surface layer 23B is formed from polypropylene, the base material layer 23A may be formed from polypropylene, and is structured as a monolayer.

The thickness of the surface layer 23B on the side opposed to the cathode 21 is preferably in the range from 0.1 μm to 10 μm. When the thickness is small, the effect of inhibiting occurrence of micro short circuit is small. Meanwhile, when the thickness is large, the ion conductivity is lowered, and the volume capacity is lowered.

The thickness of the separator 23 is preferably in the range from 5 μm to 25 μm. When the thickness is small, short circuit may occur. Meanwhile, when the thickness is large, the ion conductivity is lowered, and the volume capacity is lowered. The air permeability of the separator 23 is preferably in the range from 200 sec/100 cm³ to 600 sec/100 cm³ as a value converting to the thickness of 20 μm. When the air permeability is low, short circuit may occur. Meanwhile, when the air permeability is high, the ion conductivity is lowered. Furthermore, the porosity of the separator 23 is preferably in the range from 30% to 60%. When the porosity is low, the ion conductivity is lowered. Meanwhile, when the porosity is high, short circuit may occur. In addition, the piercing strength of the separator 23 is preferably in the range from 0.020 N/cm² to 0.061 N/cm² as a value converting to the thickness of 20 μm. When the piercing strength is low, short circuit may occur. Meanwhile, when the piercing strength is high, the ion conductivity is lowered.

An electrolytic solution as a liquid electrolyte is impregnated in the separator 23. The electrolytic solution contains, for example, a solvent and an electrolyte salt dissolved in the solvent.

As a solvent, for example, a cyclic ester carbonate such as ethylene carbonate and propylene carbonate can be used. One of ethylene carbonate and propylene carbonate is preferably used. In particular, the mixture of the both is more preferably used. Thereby, cycle characteristics can be improved.

As a solvent, further, a chain ester carbonate such as diethyl carbonate, dimethyl carbonate, ethyl methyl carbonate, and methyl propyl carbonate is preferably mixed with the foregoing cyclic ester carbonate. Thereby, high ion conductivity can be obtained.

As a solvent, furthermore, 2,4-difluoro anisole or vinylene carbonate is preferably contained. 2,4-difluoro anisole can improve the discharge capacity, and vinylene carbonate can improve the cycle characteristics. Therefore, a mixture of 2,4-difluoro anisole and vinylene carbonate is preferably used, since the discharge capacity and the cycle characteristics can be improved.

In addition, as other solvent, butylene carbonate, γ-butyrolactone, γ-valerolactone, 1,2-dimethoxyethane, tetrahydrofuran, 2-methyl tetrahydrofuran, 1,3-dioxolan, 4-methyl-1,3-dioxolan, methyl acetate, methyl propionate, acetonitrile, glutaronitrile, adiponitrile, methoxy acetonitrile, 3-methoxy propylonitrile, N,N-dimethylformamide, N-methyl pyrolidinone, N-methyl oxazolidinone, N,N-dimethyl imidazolidinone, nitromethane, nitroethane, sulfolane, dimethyl sulfoxide, and trimethyl phosphate can be cited.

In some cases, a compound obtained by substituting at least part of hydrogen of the foregoing solvent with fluorine is preferable, since such a compound may improve reversibility of electrode reaction depending on the electrode type to be combined.

As an electrolyte salt, for example, a lithium salt can be cited. One lithium salt may be used singly, or two or more lithium salts may be used by mixing. As a lithium salt, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxalato-O,O']borate, lithium bis oxalate borate, LiBr or the like can be cited. Specially, $LiPF_6$ is preferable since high ion conductivity can be obtained, and the cycle characteristics can be improved.

The secondary battery can be manufactured, for example, as follows.

First, for example, a cathode active material, an electrical conductor, and a binder are mixed to prepare a cathode mixture, which is dispersed in a solvent such as N-methyl-2-pyrrolidone to obtain a paste cathode mixture slurry. Next, the cathode current collector 21A is coated with the cathode mixture slurry, the solvent is dried, and the resultant is compression-molded by a rolling press machine or the like to form the cathode active material layer 21B and thereby forming the cathode 21.

Further, for example, an anode active material and a binder are mixed to prepare an anode mixture, which is dispersed in a solvent such as N-methyl-2-pyrrolidone to obtain paste anode mixture slurry. Next, the anode current collector 22A is coated with the anode mixture slurry, the solvent is dried, and the resultant is compression-molded by a rolling press machine or the like to form the anode active material layer 22B and thereby forming the anode 22.

Subsequently, the cathode lead 25 is attached to the cathode current collector 21A by welding or the like, and the anode lead 26 is attached to the anode current collector 22A by welding or the like. After that, the cathode 21 and the anode 22 are wound with the separator 23 in between. The end of the cathode lead 25 is welded to the safety valve mechanism 15, and the end of the anode lead 26 is welded to the battery can 11. The wound cathode 21 and the wound anode 22 are sandwiched between the pair of insulating plates 12 and 13, and contained inside the battery can 11. After the cathode 21 and the anode 22 are contained inside the battery can 11, an electrolytic solution is injected into the battery can 11 and impregnated in the separator 23. After that, at the open end of the battery can 11, the battery cover 14, the safety valve mechanism 15, and the PTC device 16 are fixed by being caulked through the gasket 17. The secondary battery shown in FIG. 1 is thereby completed.

In the secondary battery, when charged, lithium ions are extracted from the cathode active material layer 21B and inserted in the anode material capable of inserting and extracting lithium contained in the anode active material layer 22B through the electrolytic solution. Next, when discharged, the lithium ions inserted in the anode material capable of inserting and extracting lithium in the anode active material layer 22B is extracted, and inserted in the cathode active material layer 21B through the electrolytic solution. Here, since the separator 23 has the foregoing structure, the chemical stability is improved. Even when the open circuit voltage when fully charged is increased, occurrence of micro short circuit is inhibited, and the battery characteristics are improved.

As above, in this embodiment, since the open circuit voltage when fully charged is in the range from 4.25 V to 6.00 V. Therefore, a high energy density can be obtained. Further, the layer made of at least one from the group consisting of polyvinylidene fluoride, polytetrafluoroethylene, polypropylene, and aramid is provided on at least the side of the separator, which is opposed to the cathode 21. Therefore, chemical stability of the separator 23 can be improved, and occurrence of micro short circuit can be inhibited. Consequently, the energy density can be improved, and the battery characteristics such as cycle characteristics and high temperature storage characteristics can be improved.

Second Embodiment

A secondary battery according to a second embodiment of the present invention is a so-called lithium metal secondary battery, in which the anode capacity is expressed by the capacity component due to precipitation and dissolution of lithium as an electrode reactant.

The secondary battery has a structure and effects similar to of the secondary battery according to the first embodiment, except that the anode active material layer 22B has a different structure. Therefore, descriptions will be given by using the same symbols for the corresponding components with reference to FIG. 1 and FIG. 2. Descriptions of the same components will be omitted.

The anode active material layer 22B is formed from lithium metal as an anode active material, and can obtain a high energy density. The anode active material layer 22B may already exist when the battery is assembled. Otherwise, it is possible that the anode active material layer 22B does not exist when assembling the battery, and is made of lithium metal precipitated when the battery is charged. Otherwise, it is possible that the anode active material layer 22B is utilized as a current collector and the anode current collector 22A is omitted.

The secondary battery can be manufactured in the same manner as the secondary battery according to the first embodiment, except that the anode 22 is made of only the anode current collector 22A, made of only lithium metal, or made by forming the anode active material layer 22B by bonding lithium metal to the anode current collector 22A.

In the secondary battery, when charged, for example, lithium ions are extracted from the cathode 21 and precipitated as lithium metal on the surface of the anode current collector 22A through the electrolytic solution. In the result, the anode active material layer 22B is formed as shown in FIG. 2. When discharged, for example, lithium metal is eluted as lithium ions from the anode active material layer 22B, and inserted in the cathode 21 through the electrolytic solution. Here, since the separator 23 has the foregoing structure, the chemical stability is improved. Even when the open circuit voltage in full charge is increased, occurrence of micro short circuit is inhibited, and the battery characteristics are improved.

Third Embodiment

A secondary battery according to a third embodiment of the present invention is a secondary battery, in which the anode capacity includes the capacity component due to insertion and extraction of lithium as an electrode reactant and the capacity component due to precipitation and dissolution of lithium, and is expressed by the sum thereof.

The secondary battery has a structure and effects similar to of the secondary battery of the first or the second embodiment, except that the structure of the anode active material layer is different, and can be similarly manufactured. Therefore, here, descriptions will be given by using the same symbols with reference to FIG. 1 and FIG. 2. Detailed descriptions for the same components will be omitted.

In the anode active material layer 22B, for example, by setting the charging capacity of the anode material capable of inserting and extracting lithium to the value smaller than the charging capacity of the cathode 21, lithium metal begins to be precipitated on the anode 22 when the open circuit voltage (that is, battery voltage) is lower than the overcharge voltage in the charging process. Therefore, in the secondary battery, both the anode material capable of inserting and extracting lithium and lithium metal function as an anode active material, and the anode material capable of inserting and extracting lithium is a base material when the lithium metal is precipitated.

The overcharge voltage means the open circuit voltage when the battery overcharged. For example, the overcharge voltage means a higher voltage than the open circuit voltage of the battery, which is "fully charged," described in and defined by "Guideline for Safety Assessment of lithium secondary batteries" (SBA G1101), which is one of the guidelines specified by Japan Storage Battery Industries Incorporated (Battery association of Japan). In other words, the overcharge voltage means a higher voltage than the open circuit voltage after charge by using charging method used in obtaining nominal capacities of each battery, a standard charging method, or a recommended charging method.

The secondary battery is similar to traditional lithium ion secondary batteries in view of using the anode material capable of inserting and extracting lithium for the anode 22. Further, the secondary battery is similar to traditional lithium metal secondary batteries in view that lithium metal is precipitated on the anode 22. However, in the secondary battery, lithium metal is precipitated on the anode material capable of inserting and extracting lithium. Thereby, a high energy density can be obtained, and cycle characteristics and rapid charge characteristics can be improved.

In the secondary battery, when charged, lithium ions are extracted from the cathode 21, and firstly inserted in the anode material capable of inserting and extracting lithium contained in the anode 22 through the electrolytic solution. When further charged, in a state that the open circuit voltage is lower than the overcharge voltage, lithium metal begins to be precipitated on the surface of the anode material capable of inserting and extracting lithium. After that, until charge is finished, lithium metal continues to be precipitated on the anode 22. Next, when discharged, first, lithium metal precipitated on the anode 22 is eluted as ions, which are inserted in the cathode 21 through the electrolytic solution. When further discharged, lithium ions inserted in the anode material capable of inserting and extracting lithium in the anode 22 are extracted, and inserted in the cathode 21 through the electrolytic solution. Here, since the separator 23 has the foregoing structure, the chemical stability is improved. Even when the open circuit voltage in full charge is increased, occurrence of micro short circuit is inhibited, and the battery characteristics are improved.

Fourth Embodiment

Figure 3:
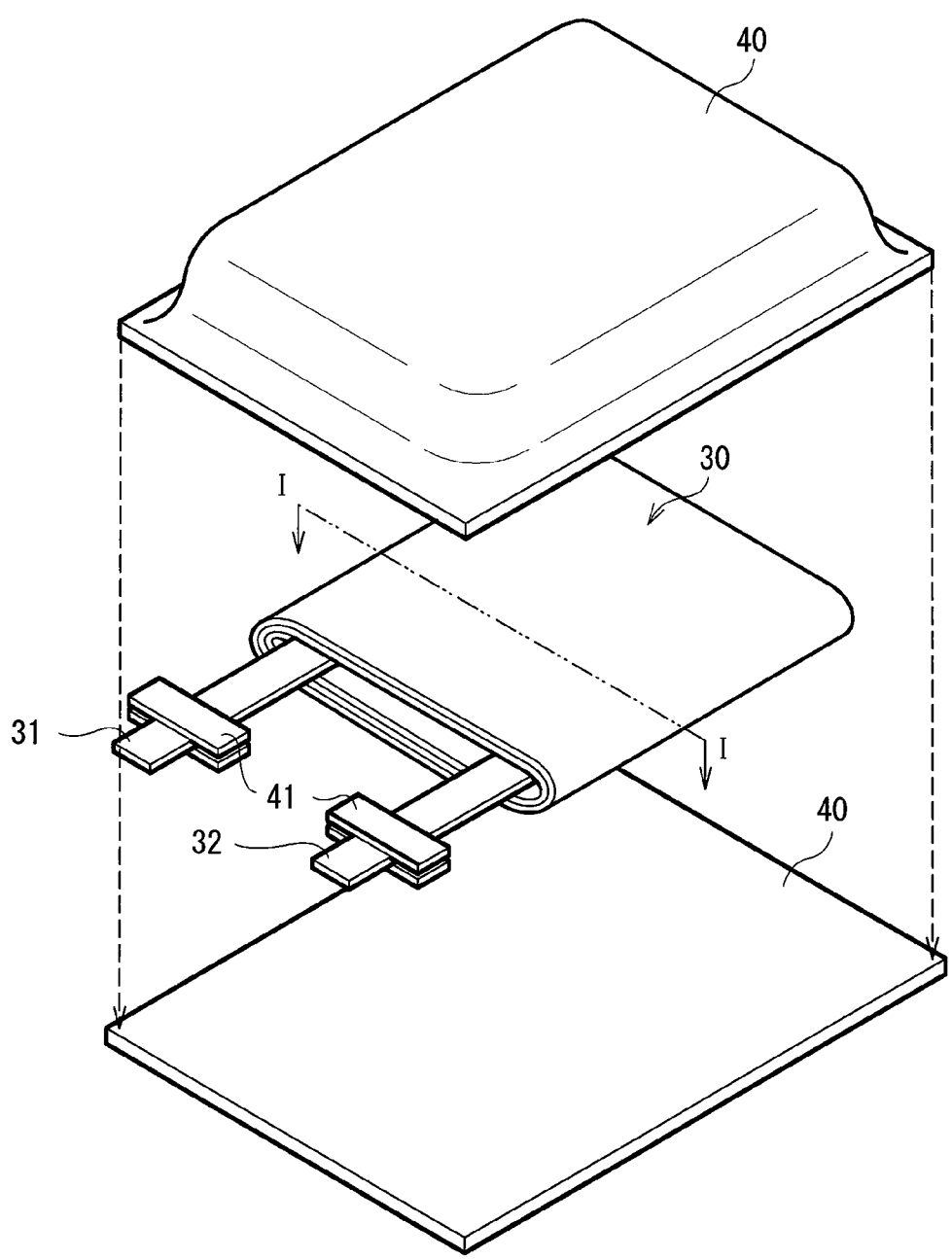
FIG. 3 is an exploded perspective view showing a structure of a secondary battery according to another embodiment of the present invention.

FIG. 3 shows a structure of a secondary battery according to a fourth embodiment of the present invention. In the secondary battery, a spirally wound electrode body 30 on which a cathode lead 31 and an anode lead 32 are attached is contained inside a film package member 40. Therefore, the size, the weight, and the thickness thereof can be reduced.

The cathode lead 31 and the anode lead 32 are respectively directed from inside to outside of the package member 40 in the same direction, for example. The cathode lead 31 and the anode lead 32 are respectively made of, for example, a metal material such as aluminum, copper, nickel, and stainless, and are in the shape of thin plate or mesh.

The package member 40 is made of a rectangular aluminum laminated film, in which, for example, a nylon film, an aluminum foil, and a polyethylene film are bonded together in this order. The package member 40 is, for example, arranged so that the polyethylene film side and the spirally wound electrode body 30 are opposed, and the respective outer edges are contacted to each other by fusion bonding or an adhesive. Adhesive films 41 to protect from outside air intrusion are inserted between the package member 40 and the cathode lead 31, the anode lead 32. The adhesive film 41 is made of a material having contact characteristics to the cathode lead 31 and the anode lead 32, for example, is made of a polyolefin resin such as polyethylene, polypropylene, modified polyethylene, and modified polypropylene.

The exterior member 40 may be made of a laminated film having other structure, a high molecular weight film such as polypropylene, or a metal film, instead of the foregoing aluminum laminated film.

Figure 4:
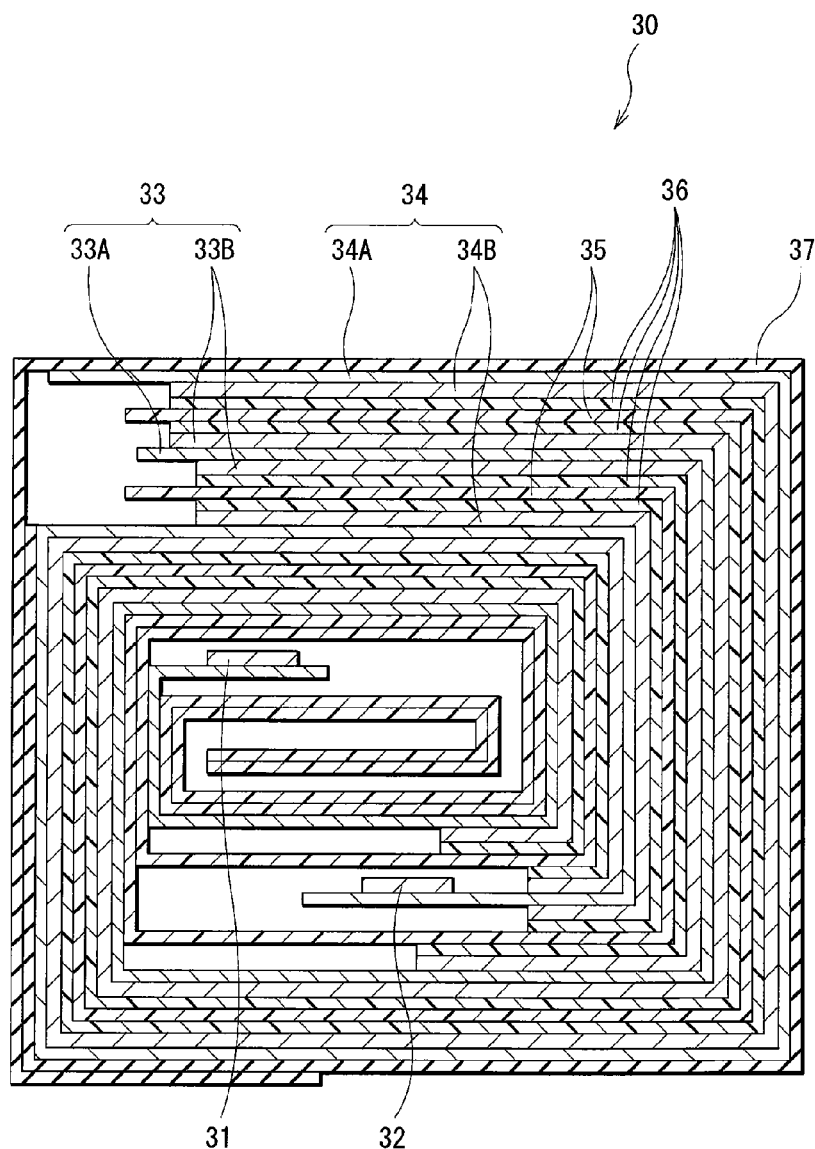
FIG. 4 is a cross section taken along line I-I of a spirally wound electrode body shown in FIG. 3.

FIG. 4 shows a cross sectional structure taken along line I-I of the spirally wound electrode body 30 shown in FIG. 3. In the spirally wound electrode body 30, a pair of cathode 33 and anode 34 are layered with a separator 35 and an electrolyte layer 36 in between and wound. The outermost periphery thereof is protected by a protective tape 37.

The cathode 33 has a structure in which a cathode active material layer 33B is provided on one face or both faces of a cathode current collector 33A. The anode 34 has a structure, in which an anode active material layer 34B is provided on one face or both faces of an anode current collector 34A. Arrangement is made so that the anode active material layer 34B side is opposed to the cathode active material layer 33B. The structures of the cathode current collector 33A, the cathode active material layer 33B, the anode current collector 34A, the anode active material layer 34B, and the separator 35 are similar to of the cathode current collector 21A, the cathode active material layer 21B, the anode current collector 22A, the anode active material layer 22B, and the separator 23 respectively described in the first to the third embodiments.

The electrolyte layer 36 is so-called gelatinous, containing an electrolytic solution and a high molecular weight compound to become a holding body, which holds the electrolytic solution. The gelatinous electrolyte layer 36 is preferable, since high ion conductivity can be obtained and liquid leakage of the battery can be prevented. The composition of the electrolytic solution (that is, a solvent, an electrolyte salt and the like) is similar to of the secondary batteries according to the first to the third embodiments. As a high molecular weight compound, for example, polyacrylonitrile, polyvinylidene fluoride, a copolymer of polyvinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, or polycarbonate can be cited. In particular, in view of chemical stability, polyacrylonitrile, polyvinylidene fluoride, polyhexafluoropropylene, or polyethylene oxide is preferable.

The secondary battery can be manufactured, for example, as follows.

First, the cathode 33 and the anode 34 are respectively coated with a precursor solution containing a solvent, an electrolyte salt, a high molecular weight compound, and a mixed solvent. The mixed solvent is volatilized to form the electrolyte layer 36. After that, the cathode lead 31 is welded to the end of the cathode current collector 33A, and the anode lead 32 is welded to the end of the anode current collector 34A. Next, the cathode 33 and the anode 34 formed with the electrolyte layer 36 are layered with the separator 35 in between to obtain a lamination. After that, the lamination is wound in the longitudinal direction, the protective tape 37 is adhered to the outermost periphery thereof to form the spirally wound electrode body 30. Lastly, for example, the spirally wound electrode body 30 is sandwiched between the package members 40, and outer edges of the exterior members 40 are contacted by thermal fusion bonding or the like to enclose the spirally wound electrode body 30. Then, the adhesive films 41 are inserted between the cathode lead 31, the anode lead 32 and the exterior member 40. Thereby, the secondary battery shown in FIG. 3 and FIG. 4 is completed.

Otherwise, the secondary battery may be fabricated as follows. First, the cathode 33 and the anode 34 are formed as described above, and the cathode lead 31 and the anode lead 32 are attached on the cathode 33 and the anode 34. After that, the cathode 33 and the anode 34 are layered with the separator 35 in between and wound. The protective tape 37 is adhered to the outermost periphery thereof, and a spirally wound body as a precursor of the spirally wound electrode body 30 is formed. Next, the spirally wound body is sandwiched between the exterior members 40, the peripheral edges except for one side are thermally fusion-bonded to obtain a pouched state, and the spirally wound body is contained inside the exterior member 40. Subsequently, an electrolytic composition containing a solvent, an electrolyte salt, a monomer as a raw material for the high molecular weight compound, a polymerization initiator, and if necessary other material such as a polymerization inhibitor is prepared, which is injected into the package member 40.

After the electrolytic composition is injected, the opening of the package member 40 is thermally fusion-bonded and hermetically sealed in the vacuum atmosphere. Next, the resultant is heated to polymerize the monomer to obtain a high molecular weight compound. Thereby, the gelatinous electrolyte layer 36 is formed, and the secondary battery shown in FIG. 3 is assembled.

The secondary battery provides action and effects similar to of the secondary batteries according to the first to the third embodiments.

EXAMPLES

Further, specific examples of the present invention will be described in detail.

Examples 1-1 to 1-4

Batteries, in which the capacity of the anode 22 was expressed by the capacity component due to insertion and extraction of lithium, that is, so-called lithium ion secondary batteries were fabricated. Then, the battery shown in FIG. 1 was fabricated.

First, a cathode active material was formed. As an aqueous solution, commercially available nickel nitrate, cobalt nitrate, and manganese nitrate were mixed so that the mol ratios of Ni, Co, Mn became 0.50, 0.20, and 0.30, respectively. After that, while the mixture was sufficiently agitated, ammonia water was dropped into the mixed solution to obtain a complex hydroxide. The complex hydroxide and lithium hydroxide were mixed, the mixture was fired for 10 hours at 900 deg C. by using an electric furnace, and pulverized to obtain lithium complex oxide powder as a cathode active material. When the obtained lithium complex oxide powder was analyzed by Atomic Absorption Spectrometry (ASS), the composition of $LiNi_{0.50}Co_{0.20}Mn_{0.30}O_2$ was verified. Further, when the particle diameter was measured by laser diffraction method, the average particle diameter was 13 μm. Further, when X-ray diffraction measurement was conducted, it was confirmed that the measurement result was similar to the pattern of $LiNiO_2$ listed in No. 09-0063 of the ICDD (International Center for Diffraction Data) card, and a layered sodium chloride structure similar to of $LiNiO_2$ was formed. Furthermore, when the obtained lithium complex oxide powder was observed by Scanning Electron Microscope (SEM), spherical particles, in which primary particles being from 0.1 μm to 5 μm in size were aggregated, were observed.

The obtained $LiNi_{0.50}Co_{0.20}Mn_{0.30}O_2$ powder, graphite as an electrical conductor, polyvinylidene fluoride as a binder were mixed at a weight ratio of $LiNi_{0.50}Co_{0.20}Mn_{0.30}O_2$ powder:graphite:polyvinylidene fluoride=86:10:4 to prepare a cathode mixture. Subsequently, the cathode mixture was dispersed in N-methyl-2-pyrrolidone as a solvent to obtain cathode mixture slurry. The both faces of the cathode current collector 21A made of a strip-shaped aluminum foil being 20 μm thick were uniformly coated with the cathode mixture slurry, which was dried and compress-molded by a rolling press machine to form the cathode active material layer 21B and thereby forming the cathode 21. The thickness of the cathode 21 was 150 μm. After that, the cathode lead 25 made of aluminum was attached to one end of the cathode current collector 21A.

Further, spheroidal graphite powder being 30 μm in average particle diameter as an anode active material and polyvinylidene fluoride as a binder were mixed at a weight ratio of spheroidal graphite powder:polyvinylidene fluoride=90:10 to prepare an anode mixture. Subsequently, the anode mixture was dispersed in N-methyl-2-pyrrolidone as a solvent to obtain anode mixture slurry. The both faces of the anode current collector 22A made of a strip-shaped copper foil being 15 μm thick were uniformly coated with the anode mixture slurry, which was provided with hot press molding to form the anode active material layer 22B and thereby forming the anode 22. The thickness of the anode 22 was 160 μm. After that, the anode lead 26 made of nickel was attached to one end of the anode current collector 22A. The electrochemical equivalent ratio between the cathode 21 and the anode 22 was designed so that the capacity of the anode 22 was expressed by the capacity component due to insertion and extraction of lithium.

After the cathode 21 and the anode 22 were respectively formed, the separator 23 made of a microporous film was prepared. Then, the anode 22, the separator 23, the cathode 21, and the separator 23 were layered in this order, and the resultant lamination was spirally wound many times. Thereby, the jelly roll type spirally wound electrode body 20 was formed. As shown in Table 1, in Example 1-1, the separator 23 in which the both faces of the base material were coated with polyvinylidene fluoride so that each thickness of the coat became 2 μm was used. In Example 1-2, the separator 23 in which the base material face on the side opposed to the cathode 21 was coated with polytetrafluoroethylene so that the thickness of the coat became 7 μm was used. In Example 1-3, the separator 23 in which the both faces of the base material were coated with polypropylene so that each thickness of the coat became 2 μm was used. In Example 1-4, the separator 23 in which the base material face on the side opposed to the cathode 21 was coated with aramid so that the thickness of the coat became 3 μm was used. For the base material, polyethylene being 16 μm thick was used.

TABLE 1

| | | Surface layer | |
| --- | --- | --- | --- |
| | Base material | Cathode side | Anode side |
| Example 1-1 | Polyethylene | Polyvinylidene fluoride | Polyvinylidene fluoride |
| Example 1-2 | | Polytetrafluoroethylene | — |
| Example 1-3 | | Polypropylene | Polypropylene |
| Example 1-4 | | Aramid | — |
| Comparative example 1-1 | Polyethylene | — | — |

After the spirally wound electrode body 20 was formed, the spirally wound electrode body 20 was sandwiched between the pair of insulating plates 12 and 13. The anode lead 26 was welded to the battery can 11, the cathode lead 25 was welded to the safety valve mechanism 15, and the spirally wound electrode body 20 was contained inside the battery can 11 made of nickel-plated iron. After that, 4.0 g of an electrolytic solution was injected into the battery can 11 by depressurization method.

For the electrolytic solution, an electrolytic solution obtained by dissolving $LiPF_6$ as an electrolyte salt in a mixed solvent of ethylene carbonate, dimethyl carbonate, and vinylene carbonate at a weight ratio of ethylene carbonate: dimethyl carbonate:vinylene carbonate=35:60:1 so that $LiPF_6$ became 1.5 mol/kg was used.

After the electrolytic solution was injected into the battery can 11, by caulking the battery can 11 with the battery cover 14 through the gasket 17 with the surface coated with asphalt, cylinder type secondary batteries being 14 mm in diameter and 65 mm in height were obtained for Examples 1-1 to 1-4.

As Comparative example 1-1 relative to Examples 1-1 to 1-4, a secondary battery was fabricated in the same manner as in Examples 1-1 to 1-4, except that polyethylene being 16 μm thick was used as the separator 23.

For the obtained secondary batteries of Examples 1-1 to 1-4 and Comparative example 1-1, high temperature storage characteristics and cycle characteristics were examined.

For high temperature storage characteristics, after constant current charge was performed by a constant current of 1000 mA until the battery voltage reached 4.4 V in the constant temperature bath set at 60 deg C., constant voltage charge was performed at 4.4 V. Then, fluctuations of the charging current values, that is, float characteristics were obtained. The results are shown in FIG. 5.

For cycle characteristics, after constant current charge was performed at a constant current of 1000 mA until the battery voltage reached 4.40 V, constant voltage charge was performed for 1 hour at a constant voltage of 4.40 V. Subsequently, constant current discharge was performed at a constant current of 2000 mA until the battery voltage reached 3 V. Such charge and discharge were repeated. The discharge capacity retention ratio at a given cycle to the discharge capacity at the first cycle was obtained as (discharge capacity at a given cycle/discharge capacity at the first cycle)×100(%). The results of Example 1-3 and Comparative example 1-1 are shown in FIG. 6.

Figure 5:
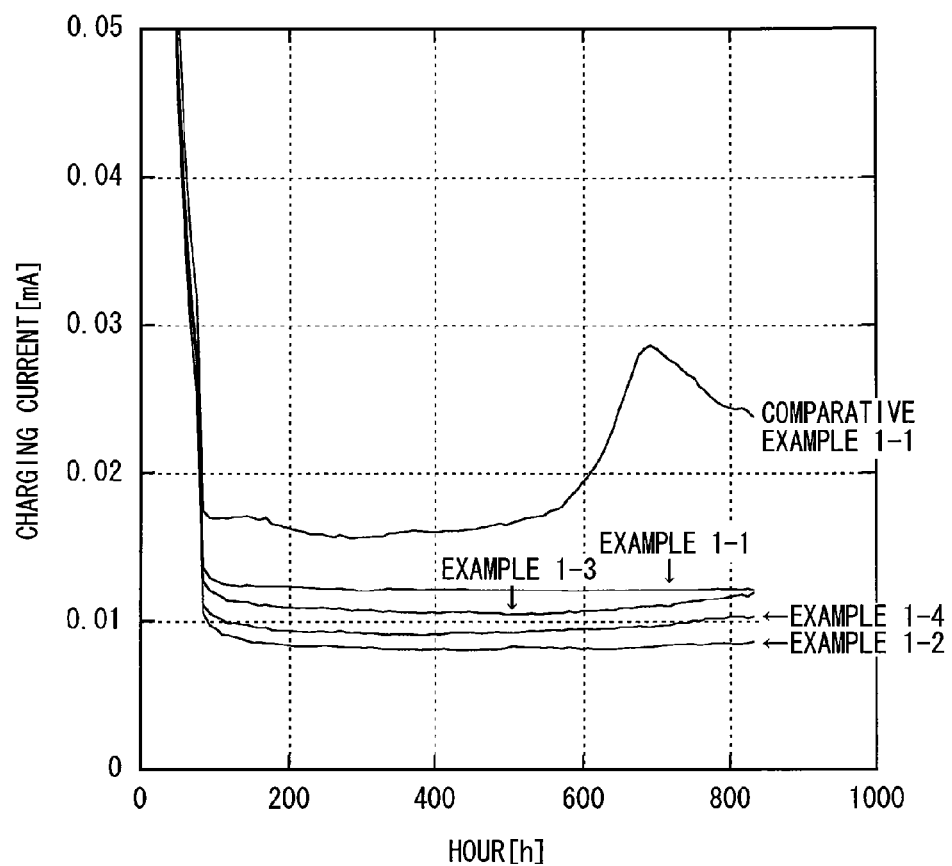
FIG. 5 is a characteristics diagram showing float characteristics in secondary batteries fabricated in examples.

As evidenced by FIG. 5, in Examples 1-1 to 1-4 using the separator 23, in which the base material was coated with polyvinylidene fluoride, polypropylene, polytetrafluoroethylene, or aramid, when time lapsed, the charging current rise was not shown. Meanwhile, in Comparative example 1-1 using the separator, in which the base material was not coated with polyvinylidene fluoride, polypropylene, polytetrafluoroethylene, or aramid, it was confirmed that when about 70 hours lapsed, charging current rise was shown, and micro short circuit occurred.

Figure 6:
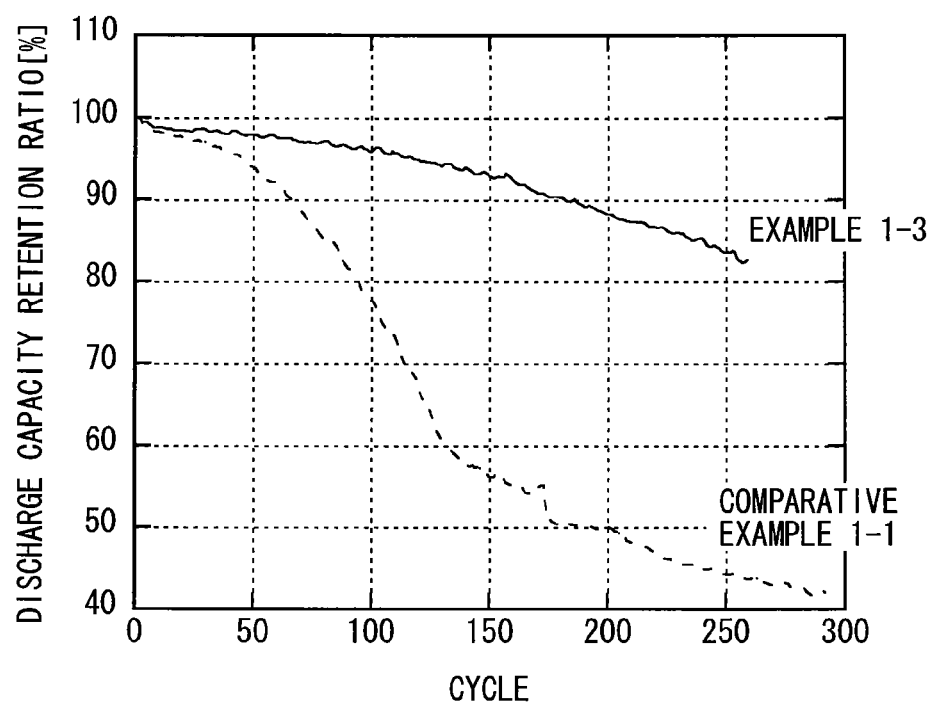
FIG. 6 is a characteristics diagram showing cycle characteristics in a secondary battery fabricated in an example.

Further, as evidenced by FIG. 6, according to Example 1-3 using the separator 23, in which the base material was coated with polypropylene, decrease in the discharge capacity retention ratio corresponding to repetition of cycles was smaller than in Comparative example 1-1 using the separator, in which the base material was not coated with polypropylene.

That is, it was found that in the battery, in which the open circuit voltage in full charge was in the range from 4.25 V to 6.00 V, when at least part of the cathode side of the separator 23 was made of at least one from the group consisting of polyvinylidene fluoride, polytetrafluoroethylene, polypropylene, and aramid, battery characteristics such as cycle characteristics and high temperature storage characteristics could be improved.

The present invention has been described with reference to the embodiments and the examples. However, the present invention is not limited to the foregoing embodiments and the foregoing examples, and various modifications may be made. For example, in the foregoing embodiments and the foregoing examples, descriptions have been given of the case using lithium as an electrode reactant. However, the present invention can be applied to the case using other Group 1A element such as sodium (Na) and potassium (K), a Group 2A element such as magnesium and calcium (Ca), other light metal such as aluminum, or an alloy of lithium or the foregoing as well, and similar effects can be thereby obtained. Then, for the anode active material, the anode material as described in the foregoing embodiments can be similarly used.

Further, in the foregoing embodiments and the foregoing examples, descriptions have been given of the secondary battery having the spirally wound structure. However, the present invention can be similarly applied to a secondary battery having a structure in which a cathode and an anode are folded or a secondary battery having a structure in which a cathode and an anode are layered. In addition, the present invention can be applied to a secondary battery such as a so-called coin type battery, a button type battery, and a square type battery.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
    a cathode;
    an anode;
    a separator between said cathode and said anode, the separator comprising a base layer, a first surface layer, and a second surface layer; and
    an electrolyte;
    wherein,
        an open circuit voltage of the battery in a full charge state is in the range of 4.25 V to 6.00V,
        the first surface layer is on a cathode-facing side of the base layer and comprises aramid,
        the first surface layer has a thickness from 0.1 µm to 10 µm,
        the separator has a thickness from 5 µm to 25 µm, and
        an air permeability of the separator is in the range from 200 sec/100 cm$^3$ to 600 sec/100 cm$^3$, both inclusive.

2. The battery according to claim 1, wherein the base layer of the separator comprises polyethylene, polypropylene, or both.

3. The battery according to claim 1, wherein the anode comprises at least one from the group consisting of graphite, graphitizable carbon, and non-graphitizable carbon.

4. The battery according to claim 1, wherein the first surface layer of the separator mainly comprises polyvinylidene fluoride.

5. The battery according to claim 1, wherein the separator has a porosity of 30% to 60%, inclusive.

6. The battery according to claim 1, wherein:
    the anode comprises an anode active material capable of inserting and extracting lithium, and
    the cathode comprises a cathode active material capable of inserting and extracting lithium.

7. The battery according to claim 6, wherein each of the cathode active material and the anode active material is in an amount that is effective to provide a lithium extraction amount per unit weight.

8. The battery according to claim 6, wherein an electrochemical equivalent of the anode active material is larger than that of the and the cathode active material.

9. The battery according to claim 6, wherein the anode active material does not substantially comprise non-graphitzable carbon material.

10. The battery according to claim 1, wherein the battery has a safety valve mechanism.

11. The battery according to claim 1, wherein the battery has a PTC (Positive Temperature Coefficient) device.

12. The battery according to claim 1, wherein the battery has a gasket.

13. The battery according to claim 6, wherein the cathode active material comprises a lithium oxide, a lithium phosphorous oxide, a lithium sulfide, or an intercalation compound containing lithium.

14. The battery according to claim 6, wherein the cathode active material comprises lithium, oxygen and a transition metal element, and,
    at least one from the group consisting of cobalt (Co), nickel (Ni), manganese (Mn), and iron (Fe) is selected as the transition metal element.

15. The battery according to claim 6, wherein the anode active material comprises at least one selected from the group consisting of magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

16. The battery according to claim 14, wherein:
    the anode active material comprises a compound of silicon or a compound of tin and,
    any one of the compounds comprises oxygen (O) or carbon (C).

17. A separator for a battery having an open circuit voltage in a full charge state in the range of 4.25 V to 6.00V and comprising:
    a base layer, and
    a first surface layer and a second layer,
    wherein,
        the first surface layer is on a cathode-facing side of the base layer and comprises aramid,
        the first surface layer has a thickness from 0.1 µm to 10 µm,
        the separator has a thickness from 5 µm to 25 µm, and
        an air permeability of the separator is in the range from 200 sec/100 cm$^3$ to 600 sec/100 cm$^3$, both inclusive.

18. The battery according to claim 1, wherein the second surface layer is on an anode-facing side of the base layer and comprises at least one of polyvinylidene fluoride or polypropylene.

19. The separator according to claim 17, wherein the second surface layer is on the anode side of the base layer and comprises at least one of polyvinylidene fluoride or polypropylene.

* * * * *